Mar. 6, 1923.
E. A. HOWARD
1,447,851
WINDSHIELD FOR MOTOR VEHICLES
Filed Nov. 16, 1921
2 sheets-sheet 1
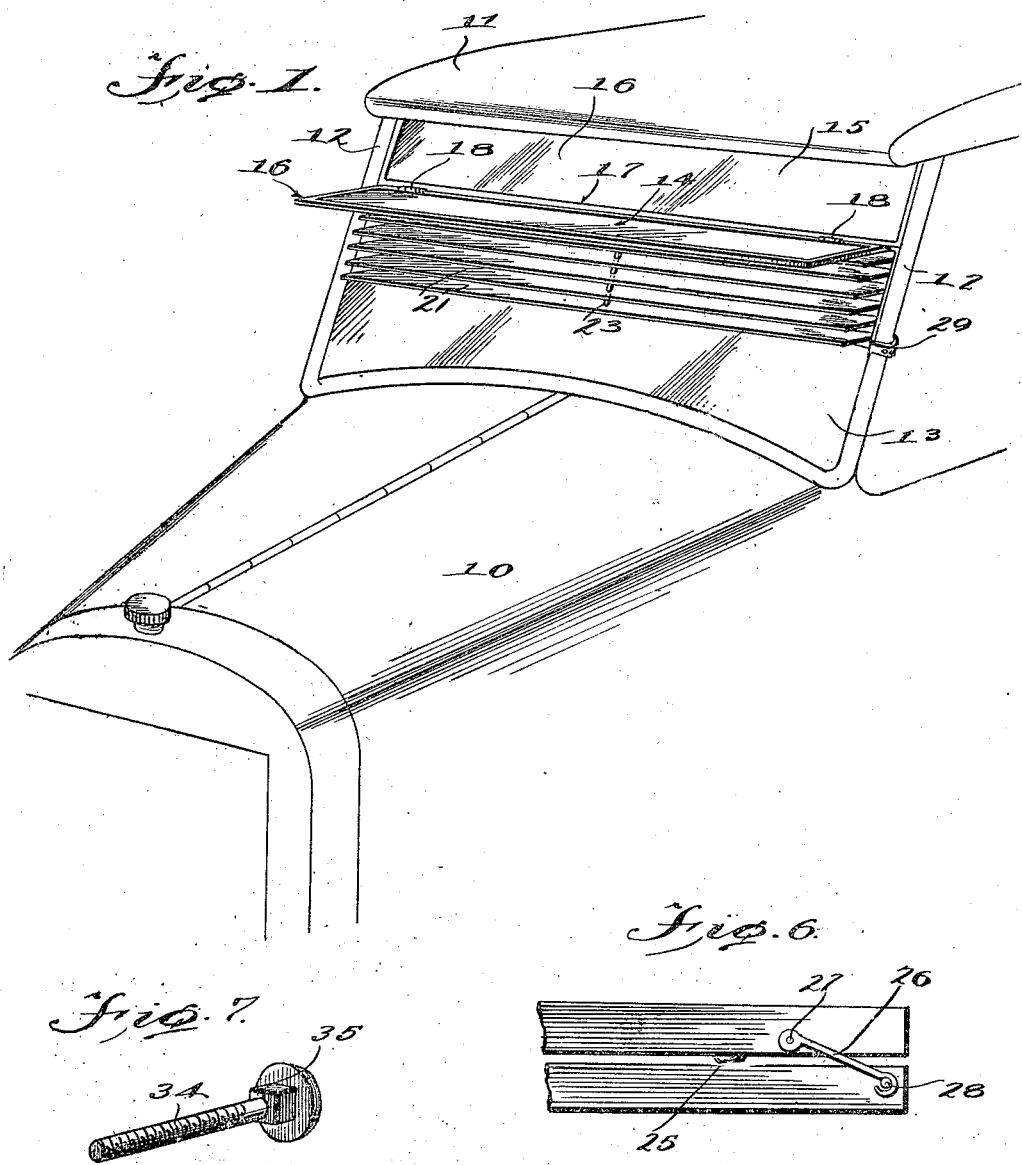
WITNESSES
INVENTOR
E. A. Howard,
BY
ATTORNEYS Mar. 6, 1923.
E. A. HOWARD
1,447,851
WINDSHIELD FOR MOTOR VEHICLES
Filed Nov. 16, 1921
2 sheets-sheet 2
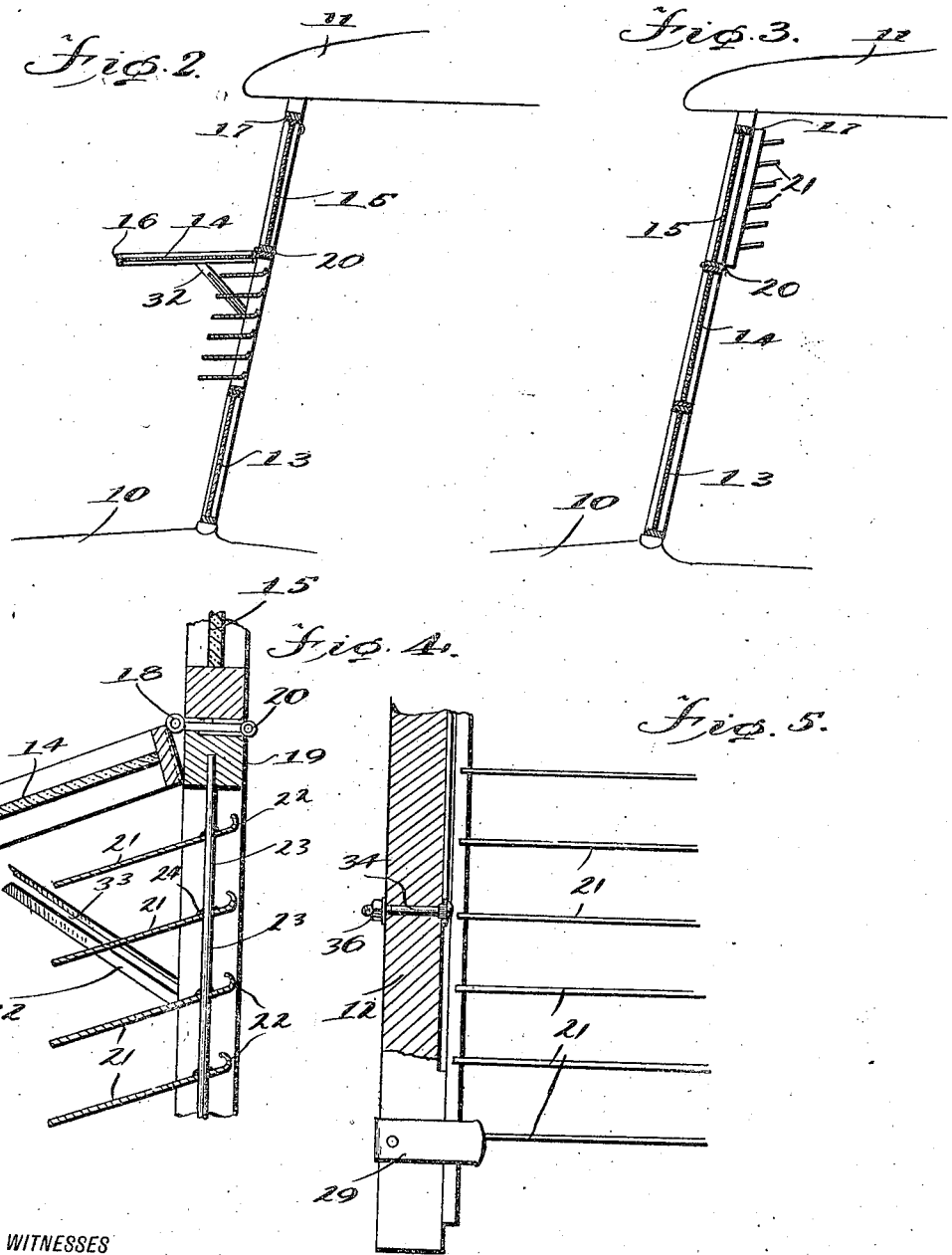

Patented Mar. 6, 1923.

1,447,851

UNITED STATES PATENT OFFICE.

EDWARD A. HOWARD, OF WATCH HILL, RHODE ISLAND.

WINDSHIELD FOR MOTOR VEHICLES.

Application filed November 16, 1921. Serial No. 515,616.

*To all whom it may concern:*

Be it known that I, EDWARD A. HOWARD, a citizen of the United States, and a resident of Watch Hill, in the county of Washington and State of Rhode Island, have invented certain new and useful Improvements in Windshields for Motor Vehicles, of which the following is a specification.

This invention relates to wind shields for motor vehicles.

The object of the invention is to provide an auxiliary wind shield adapted to be associated with the ordinary wind shield sections of a motor vehicle and when brought into use to serve as a combined ventilator and storm shield.

It is also an object of the invention that the auxiliary wind shield be adapted to be moved to a position so that it will not interfere with the normal disposal of the wind shield sections of the motor vehicle.

It is a further object of the invention that the auxiliary wind shield be easily manipulated.

In carrying out the invention it is contemplated to divide longitudinally the upper wind shield panel usually carried on a motor vehicle and to hinge together the two sections so formed. The auxiliary wind shield consists in a plurality of superposed sheetings to form a plurality of surfaces and said sheetings held in a frame which is also hinged along its longitudinal edge to the upper wind shield panel and adapted to be brought into position for substituting for the lower section of the wind shield panel when said section is swung forward.

The invention is illustrated by way of example in the accompanying drawings, in which, Figure 1 is a fragmentary view of the front portion of an automobile and showing in perspective the application of the present invention.

Figures 2 and 3 are vertical sectional views of the main wind shield panels and associated auxiliary shield and showing the auxiliary shield in its operative and inoperative positions, respectively.

Figure 4 is an enlarged detail vertical sectional view and more clearly illustrating the manner in which the auxiliary wind shield is hinged with the sections of the upper wind shield panel.

Figure 5 is a detailed rear elevation and illustrating the manner in which the lowermost section of the upper wind shield panel is held in its outwardly extending position.

Figure 6 is a detailed view illustrating the manner in which the auxiliary shield may be held in its raised position and also showing one of the bumpers carried thereby.

Figure 7 is a perspective view of the lock bolt for holding the lower wind shield section of the upper wind shield panel in its forwardly extending position.

Referring to the drawings more particularly, 10 indicates generally an automobile body, 11 the top and 12 the wind shield standards.

In this instance the lower panel 13 of the wind shield is in no way changed. The upper panel is divided longitudinally into two sections 14 and 15 and each section is preferably enclosed in a frame such as indicated at 16 and 17, respectively. The adjacent longitudinal edges of the frames 16 and 17 are hinged together by hinges as indicated at 18.

The auxiliary wind shield consists in a frame 19 which is of the same dimensions as the frame 16 and is hinged along its upper longitudinal edge to the adjacent frame member of the frame 17 by the means of hinges indicated at 20. It will be observed that the hinges 18 for connecting the frame 16 to the frame 17 occur on the forward edge of the frame while the hinges 20 for connecting the frame 19 occur on the rear edge thereof. The purpose of this construction is to permit the auxiliary wind shield to be swung to the position as indicated in Figure 3 and also to permit the section 14 of the upper wind shield to extend to its forwardly extending position indicated in Figure 2. The frame 19 carries between its end members a plurality of sheets or panels 21 which are arranged one above the other in equally spaced relation and each of which are alined rearwardly. The rear end of each sheeting is turned upwardly to form a forwardly curved lip 22, the purpose of which will later be stated. For the purpose of reinforcing the sheetings 21, that is, to prevent the same from sagging, a rod 23 is extended therethrough having its ends embedded in the longitudinal members of the frame 19 and being soldered or otherwise secured to the different sheetings or panels 21 at the point where the same passes therethrough as at 24 (Figure 4). Also, as shown in Figure 6, each end member of the frame 19 carries a bumper 25 which is semispherical in shape and preferably of rubber. Each end frame member is also provided with a hook 26 which is pivoted to the frame member as at 27 at its one end and its other end adapted to engage with a pin or the like as at 28 which extends from the small end of the frame 17.

As is seen in Figures 1 and 5 there is pivoted to one of the standards 12 a U-shaped clip 29 by the means of a pin as at 30 which permits the U-shaped clip to be swung upward or downward and adapted to engage the frame 19 of the auxiliary wind shield for holding the same in its lowered or applied position as shown in Figure 1 or Figure 2.

To each end member of the frame 16 which supports the wind shield section 14 there is pivotally connected to one end a link 32, said link being longitudinally slotted as at 33 (Figure 4) and its lower end slidably connected to a bolt 34, said bolt having a squared portion 35 (Figure 7) which is disposed in the slot 33 of the link 32 and adapted to adjustably hold the frame 16 in an obvious manner. The bolt 24 extends through one of the standards 12 and carries a suitable nut 36 for tightening and loosening the same.

In the use of the present invention assuming that the auxiliary wind shield is positioned as shown in Figure 3, that is, in its inoperative position and that the wind shield section 14 is lowered or in its operative position, should it be desired to utilize the auxiliary wind shield then the section 14 is swung to the position shown in Figures 1 and 2 and locked by manipulating the bolt 34, that is, by tightening the same for holding the link 32 which supports the wind shield section 14. The auxiliary shield is now unlatched and brought to its position shown in Figures 1 and 2 and so locked by properly manipulating the U-shaped clip 29. With the auxiliary wind shield in this position the same permits air to freely pass therethrough into the associated car or automobile. Should rain be falling then the wind shield section 14 serves to prevent the rain from being driven through the auxiliary wind shield. Also the lips 22 formed upon each of the sheetings 21 of the auxiliary wind shield serve to prevent rain passing through the wind shield to the occupants of the car.

It will be observed that the wind shield section 14 is held substantially parallel with the different sheetings 21 of the auxiliary wind shield section. It is found that this is to an advantage in the operation of the present invention.

While I have shown and described the preferred form of my invention I wish it to be understood that I am aware of the fact that the construction, combination and arrangement of parts may be changed by those skilled in the art without departing from the spirit of the invention as indicated by the appended claims.

What I claim is:

1. An auxiliary wind shield of the character described comprising a frame adapted to fit between the wind shield standards of an automobile, and a plurality of sheetings extending longitudinally of said frame and arranged one above the other, said sheetings being disposed parallel with each other and inclined rearwardly, and each sheeting having its longitudinal edge formed with an upwardly curved lip.

2. A wind shield panel comprising two sections hinged to each other along their adjacent edges, an auxiliary wind shield section comprising a frame carrying a plurality of strips extending longitudinally thereof and adapted to form surfaces parallel with each other, said frame being connected with the wind shield panel and adapted to be brought in position for substituting for one of said sections of the wind shield panel when said panel is swung upon its hinges.

3. In combination, a wind shield panel comprising two sections hingedly connected to each other and one of said sections being adapted to be swung forwardly and upwardly with respect to the other section, an auxiliary wind shield adapted to be brought into position for substituting for the wind shield section swung forwardly and upwardly, said auxiliary wind shield comprising a plurality of super-posed surfaces adapted to extend the length of the wind shield section which is replaced.

4. In combination, a wind shield panel comprising a pair of sections hingedly connected along adjacent longitudinal edges, an auxiliary wind shield section comprising a frame and a plurality of sheetings extending between the ends of said frame, said sheetings being arranged one above the other and inclined in a similar direction and said auxiliary wind shield being adapted to substitute for one of the wind shield sections of said wind shield panel when the same is swung to an angular and inoperative position with respect to the other wind shield section.

5. A wind shield panel comprising an upper and a lower section hinged to each other along adjacent longitudinal edges and said lower section adapted to be swung forwardly and upwardly with respect to the upper section, an auxiliary wind shield comprising a frame having the dimensions of the lower wind shield section, a plurality of sheetings supported between the end members of said frame to provide surfaces parallel to each other and arranged one above the other, and means whereby said frame may be secured so that the same may be swung into position or substituted for the lower wind shield section when said section is swung forwardly and upwardly, and means for locking the lower wind shield section when swung forwardly and upwardly with respect to the upper wind shield section.

6. A wind shield panel comprising an upper and a lower section hinged to each other along adjacent longitudinal edges and said lower section adapted to be swung forwardly and upwardly with respect to the upper section, an auxiliary wind shield comprising a frame having the dimensions of the lower wind shield section, a plurality of sheetings supported between the end members of said frame to provide surfaces parallel to each other and arranged one above the other, and means whereby said frame may be secured so that the same may be swung into position or substituted for the lower wind shield section when said section is swung forwardly and upwardly, means for locking the lower wind shield section when swung forwardly and upwardly with respect to the upper wind shield section, and means for locking the auxiliary wind shield in its operative position.

EDWARD A. HOWARD.